United States Patent [19]
Gupta

[11] Patent Number: 5,818,872
[45] Date of Patent: Oct. 6, 1998

[54] TIMING OFFSET ERROR EXTRACTION METHOD AND APPARATUS

[75] Inventor: Sanjay Gupta, Raleigh, N.C.

[73] Assignee: Cirrus Logic, Inc., Fremont, Calif.

[21] Appl. No.: 778,729

[22] Filed: Dec. 31, 1996

[51] Int. Cl.⁶ .................................................. H04B 1/10
[52] U.S. Cl. .................. 375/222; 375/226; 375/227; 375/285; 375/340; 375/349; 455/303
[58] Field of Search .................................. 375/222, 224, 375/226, 227, 285, 340, 346, 349; 379/416; 455/67.3, 67.4, 296, 303; 370/210, 252

[56] References Cited

U.S. PATENT DOCUMENTS

| | | | |
|---|---|---|---|
| 4,250,458 | 2/1981 | Richmond et al. | 329/112 |
| 4,516,070 | 5/1985 | Brown et al. | 324/117 R |
| 4,520,493 | 5/1985 | Heard et al. | 375/97 |
| 4,712,222 | 12/1987 | Heard et al. | 375/77 |
| 4,941,155 | 7/1990 | Chuang et al. | 375/84 |
| 4,996,529 | 2/1991 | Connell | 341/118 |
| 5,150,380 | 9/1992 | Okanoue | 375/16 |
| 5,206,886 | 4/1993 | Bingham | 375/97 |
| 5,228,062 | 7/1993 | Bingham | 375/344 |
| 5,241,702 | 8/1993 | Dent | 455/278.1 |
| 5,245,611 | 9/1993 | Ling et al. | 370/100.1 |
| 5,304,947 | 4/1994 | Carlsson | 330/279 |
| 5,422,889 | 6/1995 | Sevenhans et al. | 370/95.3 |
| 5,422,917 | 6/1995 | Scott | 375/371 |
| 5,442,492 | 8/1995 | Cunningham et al. | 360/46 |
| 5,519,441 | 5/1996 | Gusmano et al. | 348/207 |
| 5,583,886 | 12/1996 | Rohani et al. | 375/227 |
| 5,715,277 | 2/1998 | Goodson et al. | 375/222 |

*Primary Examiner*—Don N. Vo
*Assistant Examiner*—Amanda T. Le
*Attorney, Agent, or Firm*—Robert P. Bell; Frank D. Nguyen

[57] ABSTRACT

A periodic training signal is transmitted over a communications channel from a transmitter to a receiver. At the receiver, a spectrum estimation module is used to measure the spectrum of a set of uncorrected samples of the periodic training signal. The spectrum estimate is available at a discrete frequency spacing of an integer fraction (L>1) of the frequency spacing of the set of samples of the periodic training signal. A timing offset estimation module is then used to measure the ppm offset between the local and remote crystals. The timing offset estimation module runs in parallel with the spectrum estimation module. The spectrum estimate is convolved with the DFT of a periodic ramp function and the result squared to product an error spectrum. The error spectrum represents the error induced by differences between timing in the transmitter and receiver clock. The error spectrum is subtracted from the estimated spectrum to produce a corrected spectrum. The corrected spectrum may be used to generate an SNR spectrum to characterize the communications channel.

24 Claims, 3 Drawing Sheets

TIMING OFFSET ERROR EXTRACTION METHOD AND APPARATUS

FIELD OF THE INVENTION

The present invention relates to the field of modem communications, particularly an apparatus and method for correcting for timing offset between a transmitter and receiver.

BACKGROUND OF THE INVENTION

In digital communications, such as two-wire modem applications, it may be desirable (to increase overall data bandwidth) to measure the distortion effect of the communications channel and determine the overall signal-to-noise ratio (SNR) spectrum. A receiver may be required to measure the effects of impairments to the communications channel which may distort signals transmitted by a remote transmitter.

A transmitter may send a training signal over the communications channel to the receiver for a pre-specified interval of time. The receiver may then receive the training signal, and by comparing the received training signal to the transmitted training signal, determine the spectrum for that channel and SNR spectrum. Such training signals may be sent periodically for a better estimate of the channel spectrum and SNR spectrum.

In some applications (e.g., the L1 and L2 segments in a V.34 modem), a periodic probe signal comprising discrete sinusoids may be transmitted through the communications channel. The receiver may then measure the spectrum of the received signal to properly characterize the spectrum of the communications channel and SNR spectrum.

However, the tolerance for a crystal oscillator in a transmitter or receiver modem may be on the order of +/−100 ppm (i.e., +/−0.01%). Thus the oscillators of the transmitter and receiver modems may be off by as much as 200 ppm (e.g. 0.02%). As a result, attempts to characterize the communications channel may be somewhat degraded, yielding an overly pessimistic estimate of channel quality.

Accurately measuring the timing offset between the transmitter and receiver oscillators may require the entire duration of the probe signal, leaving no time for spectrum estimation of the received signal. One approach to solving this problem would be to buffer the probe signal samples while simultaneously estimating the timing offset during the probe signal period. The buffered samples could be corrected for timing error and then fed into the spectrum estimation module.

However, such an approach may require a large amount of buffering to store samples from the probe signal. Moreover, such an approach may delay estimation of the SNR spectrum. In addition, a user may wish to use some alternative means of estimating timing offset between transmitter and receiver crystals.

An example of a prior art approach for correcting timing offset is disclosed in Bincham, U.S. Pat. No. 5,206,886, issued Apr. 27, 1993, and incorporated herein by reference. Bingham discloses a method and apparatus for correcting for clock and carrier frequency offset and phase jitter in multi-carrier modems. Bingham discloses a technique for measuring carrier and clock frequency offsets by separating the real and imaginary parts of the received pilot tones using four band-pass filters to generate sampled signals.

The outputs of the four band-pass filters are applied to arctangent operators to calculate phases of each pair of samples. Each phase is fitted to a linear function of time using a Least Mean Squared Error criterion, and carrier and clock frequency offsets estimated therefrom (See, e.g., col. 5, lines 3–60).

SUMMARY OF THE INVENTION

The present invention does not rely upon the availability of the timing ppm offset prior to obtaining the spectrum estimate. Rather, whenever this estimate is available, it is used to decompose previously estimated spectrum to extract the spectral component of the timing offset error.

A spectrum estimation module is used to measure the spectrum from a set of uncorrected samples of the periodic training signal transmitted by a remote modem transmitter. The spectrum estimate is available at a discrete frequency spacing of an integer fraction (L>1) of the frequency spacing of the set of samples of the periodic training signal. A timing offset estimation module is then used to measure the ppm offset between the local and remote crystals.

The timing offset estimation module runs in parallel with the spectrum estimation module. Alternatively, the timing offset estimation is available apriori or otherwise through a different sample set by an alternative estimation module. In the case where there is only one set of samples of the periodic training signal for spectrum estimation and timing offset estimation, it may be desirable to run both estimators in parallel to fully use the sample set for each estimator, and also to simplify implementation for real-time application.

The spectrum estimate from the spectrum estimation module is processed to eliminate error caused by incorrect sampling of the sampling set due to timing offset between transmitter and receiver clocks.

DETAILED DESCRIPTION OF THE INVENTION

Figure 1:
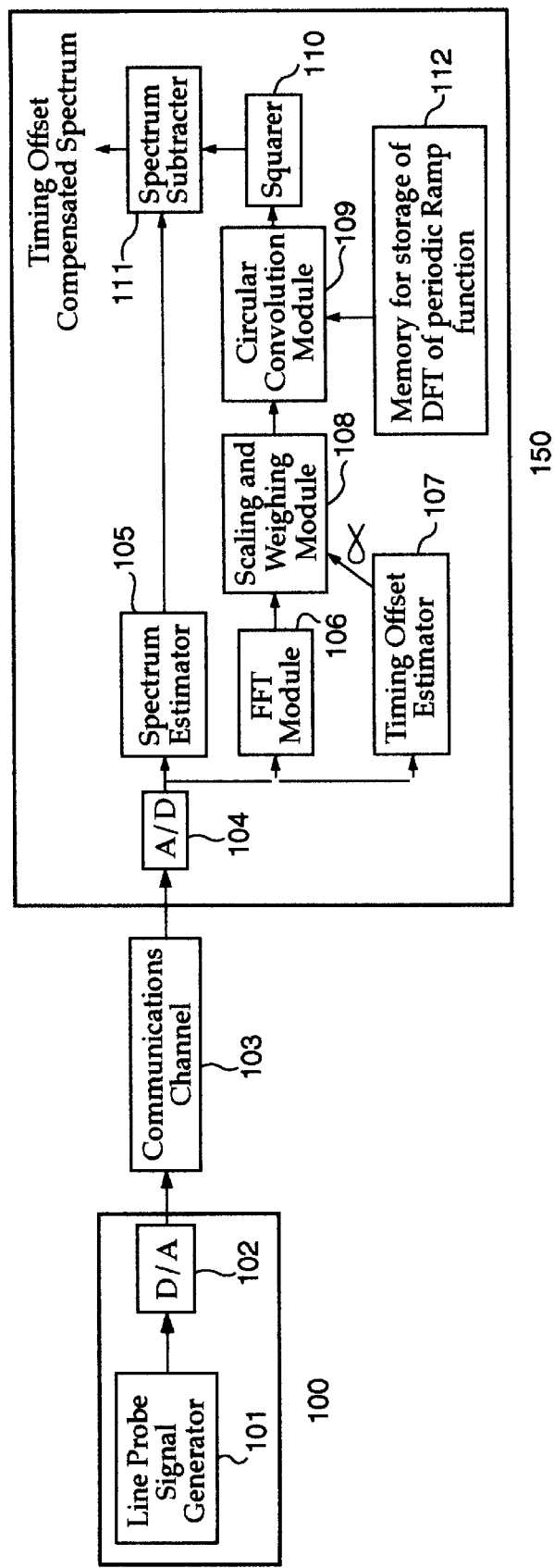
FIG. 1 is a block diagram illustrating the timing offset extraction apparatus of the present invention.

In phase 2 of International Telecommunications Union Telecommunications Standardization Sector (ITU-TSS) ITU Recommendation V.34, incorporated herein by reference, channel measurements are performed on the sampled probe signal. The sampled probe signal is a set of equispaced tones (sinusoids) defined as follows:

$$x(n) = \sum_{m=1}^{25} A_m \cos(2\pi m \Delta_f (1+\alpha) n/f_s + \phi_m) \quad (1)$$

Where:

$A_m (\epsilon\{0,1i\})$ is the amplitude of the tones $\Phi_m (\epsilon\{0,1\pi\})$ is the phase of the tones $\Delta_f$ is the frequency spacing (150 Hz)

$f_s$ is the sampling frequency $\alpha$ is the sample timing offset ($\leq 200$ ppm)

In order to measure the spectrum of the channel and the SNR spectrum, the averaged periodogram on the probing signal is calculated, where frequency spacing ($\Delta_k$) is half of the tone spacing (i.e., $\Delta_k=\Delta_f/2$ or 75 Hz). Thus, the probe frequencies and noise estimates may be tapped off alternate bins.

The effect of the timing offset is to leak energy from the signal bins to the noise bins causing an apparent degradation in the SNR spectrum. Thus, it is necessary to measure the value of $\alpha$ and also to undo the effects of $\alpha$ on the channel spectrum and SNR spectrum.

Accordingly rewriting Equation (1) yields:

$$x(n) = \sum_{m=1}^{25} A_m \{\cos(2\pi m\Delta_f n/f_s + \phi_m)\cos(2\pi m\Delta_f \alpha n/f_s) - \sin(2\pi m\Delta_f n/f_s + \phi_m)\sin(2\pi m\Delta_f \alpha n/f_s)\} \quad (2)$$

Since $\alpha<<1$, it may be approximated, as a limit, $\cos(\alpha) \to 1$, and $\sin(\alpha) \to \alpha$. Thus, Equation (2) may be rewritten as:

$$x(n) = \sum_{m=1}^{25} A_m \{\cos(2\pi m\Delta_f n/f_s + \phi_m) - (2\pi m\Delta_f \alpha n/f_s)\sin(2\pi m\Delta_f n/f_s + \phi_m)\} \quad (3)$$

or:

$$x(n)=x'(n)-e(n) \quad (4)$$

Where x'(n) is the true sampled received signal without timing offset, and e(n) is the error signal generated from the incorrect sampling. Substituting, we derive e(n) as:

$$e(n) = (2\pi\Delta_f\alpha/f_s) \sum_{m=1}^{25} nA_m m\sin(2\pi m\Delta_f n/f_s + \phi_m) \quad (5)$$

Taking the Discrete Fourier Transform (DFT) of Equation (5) yields:

$$E(k) = (2\pi\Delta_f\alpha/f_s) \sum_{n=0}^{N-1} \sum_{m=1}^{25} nA_m m\sin[2\pi m\Delta_f n/f_s + \phi_m]\exp(-j2\pi nk/N) \quad (6)$$

Factoring out "n" from inner summation in Equation (6) yields:

$$E(k) = (2\pi\Delta_f\alpha/f_s) \sum_{n=0}^{N-1} n \sum_{m=1}^{25} A_m m\sin[2\pi m\Delta_f n/f_s + \phi_m]\exp(-j2\pi nk/N) \quad (7)$$

Now, to solve Equation (7), the frequency domain counterpart to the convolution property may be used (i.e., the product of the two signals in the time domain is equivalent to the circular convolution in the frequency domain), or $$x(n)y(n)=X(K)^* Y(K) \quad (8)$$

Where "*" denotes circular convolution rewriting Equation (7) yields:

$$E(k) = (2\pi\Delta_f\alpha/f_s) \left\{ R(k)^*DFT\left[\sum_{m=1}^{25} A_m m\sin[2\pi m\Delta_f n/f_s + \phi_m]\right] \right\} \quad (9)$$

$$E(k) = \quad (10)$$

$$(2\pi\Delta_f\alpha/f_s) \left\{ R(k)^*DFT\left[\sum_{m=1}^{25} A_m m\cos[2\pi m\Delta_f n/f_s + \phi_m]\right] \exp(-j\pi/4m) \right\}$$

$$E(k) = (2\pi\Delta_f\alpha/f_s)\{R(k)^*DFT[y'(n)]\} \quad (11)$$

Where:

$$Y'(k)=a(k)X'(k), k=0,1,2,\ldots N-1 \quad (12)$$

Given that:

$$a(k) = k/L \exp(-j\pi L/4k), \text{ for } k \text{ even} \quad (13)$$
$$= 0, \text{ for } k \text{ odd} \quad (14)$$

Note, for the above discussion, the frequency spacing is half of the tone spacing (i.e., L=2) and R(k) is the DFT of the periodic ramp function. Note also that frequency domain spacing is given by $\Delta f/L$.

In deriving Equations (13) and (14), the time shifting property is used, along with the fact that $\exp(-j\pi L/4m)$ corresponds to a phase shift of $\pi/2$ for the m'th frequency. In addition, Y'(k) is the DFT of y'(n) as defined above in Equation 11. Y' represents the DFT of the received signal without timing offset, weighted by the respective frequency indices. However, since the signal bins are minimally affected by the timing offset, these may be used from the DFT of the received signal without timing offset compensation.

Equations (11), (13), and (14) may be used to compute timing error using the following steps:

1. The averaged Fast Fourier Transform (FFT) of the received signal is computed and scaled by a(k);
2. A complex circular convolution is performed between Y' and the DFT of the periodic time domain ramp function (possibly pre-stored in memory) to obtain the DFT of the error signal E.
3. The spectrum of error signal $E_s(k)$ is then:

$$E_s(k)=E(k) \text{ conj}(E(k))=|E(k)|^2 \quad (15)$$

If S'(k) is the spectrum of the received training signal measured by the estimator, then the corrected (true) received spectrum S(k) is given by:

$$S(k)=S'(k)-E_s(k) \quad (16)$$

The above Equations will now be applied in connection with FIGS. 1–4 to illustrate the operation of the present invention. FIG. 1 is a block diagram illustrating the timing offset extraction apparatus of the present invention. Line probe signal generator 101 within transmitter 100 generates a series of sinusoids according to Equation (1) above as a training signal. D/A converter 102 converts these signals into analog form for transmission over communications channel 103. Communications channel 103 may comprise, for example, a telephone line or the like.

A/D converter 104 within receiver 150 receives the training signal over communications channel 103 and converts the signal into digital form. The training signal is then received by spectrum estimator 105 which generates an initial spectrum estimation $Sr_x$ as illustrated in FIG. 3.

Figure 3:
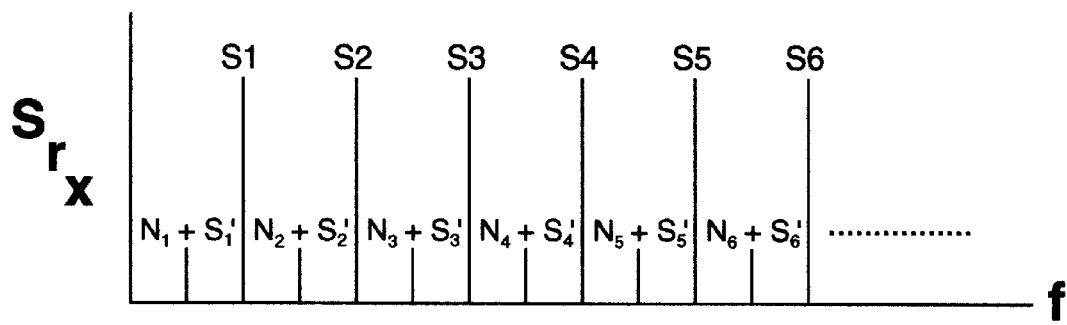
FIG. 3 is a composite graph illustrating the initial spectrum estimation $Sr_x$ of the received training signals in the frequency domain, along with frequency components which may be generated due to timing error.

FIG. 3 is a composite graph illustrating the initial spectrum estimation $Sr_x$ of the received training signals in the frequency domain, along with frequency components which may be generated due to noise and timing error. The x-axis represents frequency, while the y-axis represents amplitude of each frequency component.

Several frequency components may be present in FIG. 3. Signal components $S_i$ (e.g., $S_1$, $S_2$, $S_3$, $S_4$, . . .) represent signal portion of the training signal transmitted from transmitter 100. Signal components $N_i$ (e.g., $N_1$, $N_2$, $N_3$, $N_4$, . . .) represent noise components introduced over communications channel 103. In order to determine the SNR spectrum for communications channel 103, the received training signal may be compared to a training signal generated within receiver 150.

However, as noted above, the clock frequencies of transmitter 100 and receiver 150 may be off from one another by as much as 200 ppm, as each is locally generated. Thus, in determining the SNR spectrum in FIG. 3, an additional component $S_i'$ (e.g., $S_1'$, $S_2'$, $S_3'$, $S_4'$, ...) may be generated due to clock timing offset. The additional error due to clock timing offset may appear as an increase in the noise component. Thus, any calculation of SNR spectrum many be overly pessimistic and resultant performance unnecessarily reduced.

Rather than attempt to remove $S_i'$ from the received training signal prior to spectrum estimation, the present invention removes this component from the estimated spectrum after the fact, reducing or eliminating the need for buffer storage of data and offering the possibility of correcting spectrum estimation in real time.

Figure 2:
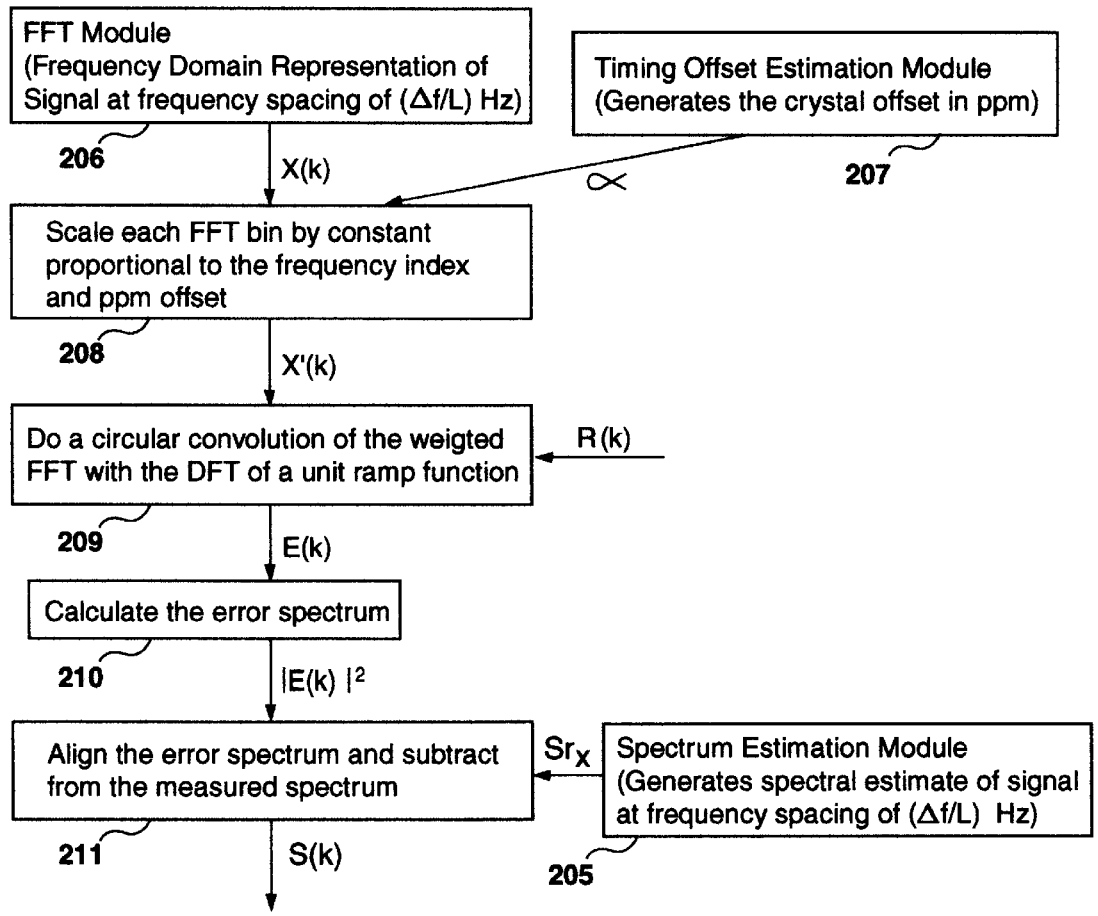
FIG. 2 is a flow chart illustrating the steps performed in the timing offset error method of the present invention.

The remainder of FIG. 1 will now be discussed in connection with the flow chart of FIG. 2. In step 206, FFT module 106 generates a frequency domain representation X(k) of the received training signal at a frequency spacing of $\Delta f/L$ Hz, where L>1 and $\Delta f$ is the frequency spacing of the periodic training signal. Simultaneously, timing offset estimator module 107 generates the crystal offset α (in ppm) in step 207.

In step 208, scaling and weighting module 108 scales each FFT bin by a constant proportional to the frequency index and a constant proportional to the α ppm offset to generate a scaled and weighted frequency domain representation X'(k). The weighted frequency domain representation X'(k) may be circularly convolved with the DFT of unit ramp function R(k).

Figure 4:
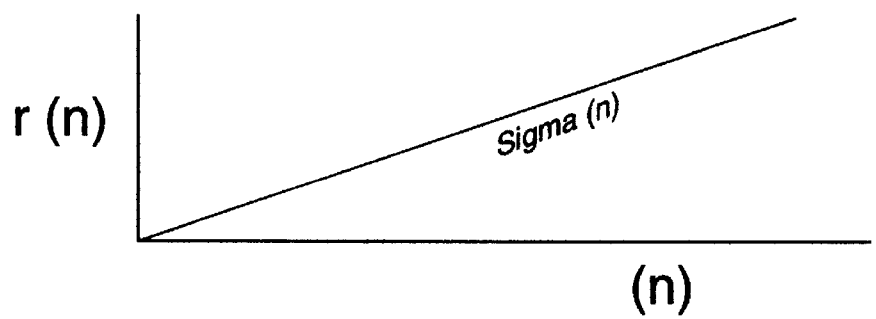
FIG. 4 illustrates unit ramp function r(n) in the time domain.

FIG. 4 illustrates unit ramp function r(n) in the time domain. For an increase in time n, ramp function r(n) increases with a slope of 1 (hence a unit ramp function). As noted above in Equation (8), the product of the two signals in the time domain is equivalent to the circular convolution in the frequency domain. Memory 112 may store the unit ramp function of r(n) in the frequency domain as R(k), where R(k)=FFT {r(n)}. The output of circular convolution module 109 in step 209 is error $E_s(k)$ representing error, in the frequency domain, due to timing offset.

Squarer 110 may calculate the error spectrum from error E(k) to produce error spectrum $|E(k)|^2$ in step 210. In step 211, spectrum subtractor 111 aligns the error spectrum $|E(k)|^2$ with the estimated spectrum $Sr_x$ generated by spectrum estimator 105 in step 205 and subtracts error spectrum $|E(k)|^2$ from the estimated spectrum $Sr_x$ to produce timing offset compensated spectrum S(k).

Once timing offset compensated spectrum S(k) as been generated in step 211, the distortion effect of communications channel 103 may be measured to determine the overall signal-to-noise ratio (SNR) spectrum using conventional techniques. Bandwidth of communications channel 103 may then be optimized for the available SNR spectrum.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A method for correcting for timing offset between a transmitter clock and a receiver clock when determining signal to noise ratio spectrum for a communications channel, comprising the steps of:

generating a training signal at the transmitter;

transmitting the training signal over the communications channel;

receiving the training signal at the receiver;

generating an estimated spectrum of the received training signal;

estimating a timing offset between the first clock of the transmitter and the second clock of the receiver;

generating a fourier transform of the received training signal;

circularly convolving the fourier transform of the received training signal with a fourier transform of a periodic ramp function to produce an error spectrum; and subtracting the error spectrum from the estimated spectrum of the received training signal to produce a corrected spectrum of the received training signal corrected for timing offset between the first clock of the transmitter and the second clock of the receiver.

2. The method of claim 1, further comprising the step of:

weighting the fourier transform of the received training signal with a constant proportional to the timing offset to produce a weighted fourier transform of the received training signal;

wherein said step of circularly convolving the fourier transform of the received training signal with a fourier transform of a periodic ramp function to produce an error spectrum comprises the step of circularly convolving the weighted fourier transform of the received training signal with a fourier transform of a periodic ramp function to produce an error spectrum.

3. The method of claim 1, wherein said step of circularly convolving the fourier transform of the received training signal with a fourier transform of a periodic ramp function to produce an error spectrum comprises the steps of:

circularly convolving the fourier transform of the received training signal with a fourier transform of a periodic ramp function to produce an error signal; and squaring the error signal to produce an error spectrum.

4. The method of claim 3, wherein said step of circularly convolving the fourier transform of the received training signal with a fourier transform of a periodic ramp function comprises the steps of:

storing in a memory, a fourier transform of a period ramp function; and circularly convolving the fourier transform of the received training signal with the fourier transform of a periodic ramp function stored in the memory to produce an error signal.

5. The method of claim 4, wherein the periodic ramp function is a unit ramp function.

6. The method of claim 5, wherein the fourier transform of the received training signal is a discrete fourier transform of the received training signal.

7. An apparatus for compensating for timing offset between a transmitter clock and a receiver clock when determining signal to noise ratio spectrum for a communications channel, comprising:

means for receiving a training signal transmitted by the transmitter over a communications channel;

a spectrum estimator for generating an estimated spectrum of the received training signal;

a timing offset estimator for estimating a timing offset between the transmitter clock and receiver clock;

a fourier transform generator for generating a fourier transform of the received training signal;

a circular convolution module for circularly convolving the fourier transform of the received training signal with a fourier transform of a periodic ramp function to produce an error spectrum; and a spectrum subtractor for subtracting the error spectrum from the estimated spectrum of the received training signal to produce a corrected spectrum of the received training signal corrected for timing offset between the transmitter clock and the receiver clock.

8. The apparatus of claim 7, further comprising:

a weighting module for weighting the fourier transform of the received training signal output from the spectrum estimator with a constant proportional to the timing offset to produce a weighted fourier transform of the received training signal.

9. The apparatus of claim 7, wherein said circular convolution module comprises:

memory for storing a discrete fourier transform of a periodic ramp function;

means for circularly convolving the fourier transform of the received training signal with the discrete fourier transform of a periodic ramp function stored in memory to produce an error signal; and a squarer for squaring the error signal to produce an error spectrum.

10. The apparatus of claim 9, wherein said means for circularly convolving the fourier transform of the received training signal with a fourier transform of a periodic ramp function comprises:

a memory for storing a fourier transform of a period ramp function; and means circularly convolving the fourier transform of the received training signal with the fourier transform of a periodic ramp function stored in said memory to produce an error signal.

11. The apparatus of claim 10, wherein the periodic ramp function is a unit ramp function.

12. The apparatus of claim 11, wherein the fourier transform of the received training signal is a discrete fourier transform of the received training signal.

13. A method for correcting a spectrum for timing offset, comprising the steps of:

generating an estimated spectrum of a received signal;

estimating a timing offset from the estimated spectrum;

generating a fourier transform of the received signal;

circularly convolving the fourier transform of the received signal with a fourier transform of a periodic ramp function to produce an error spectrum; and subtracting the error spectrum from the estimated spectrum of the received signal to produce a spectrum corrected for timing offset.

14. The method of claim 13, further comprising the step of:

weighting the fourier transform of the received signal with a constant proportional to the timing offset to produce a weighted fourier transform of the received signal;

wherein said step of circularly convolving the fourier transform of the received signal with a fourier transform of a periodic ramp function to produce an error spectrum comprises the step of circularly convolving the weighted fourier transform of the received signal with a fourier transform of a periodic ramp function to produce an error spectrum.

15. The method of claim 13, wherein said step of circularly convolving the fourier transform of the received signal with a fourier transform of a periodic ramp function to produce an error spectrum comprises the steps of:

circularly convolving the fourier transform of the received signal with a discrete fourier transform of a periodic ramp function to produce an error signal; and squaring the error signal to produce an error spectrum.

16. The method of claim 15, wherein said step of circularly convolving the fourier transform of the received signal with a fourier transform of a periodic ramp function comprises the steps of:

storing in a memory, a fourier transform of a period ramp function; and circularly convolving the fourier transform of the received signal with the fourier transform of a periodic ramp function stored in the memory to produce an error signal.

17. The method of claim 16, wherein the periodic ramp function is a unit ramp function.

18. The method of claim 17, wherein the fourier transform of the received signal is a discrete fourier transform of the received signal.

19. An apparatus for compensating for timing offset in a spectrum, comprising:

a spectrum estimator for generating an estimated spectrum of a received signal;

a timing offset estimator for estimating a timing offset from the estimated spectrum;

a circular convolution module for circularly convolving the fourier transform of the received signal with a fourier transform of a periodic ramp function to produce an error spectrum; and a spectrum subtractor for subtracting the error spectrum from the estimated spectrum to produce a spectrum corrected for timing offset.

20. The apparatus of claim 19, further comprising:

a weighting module for weighting the fourier transform of the received signal output from the spectrum estimator with a constant proportional to the timing offset to produce a weighted fourier transform of the received signal.

21. The apparatus of claim 20, wherein said circular convolution module comprises:

memory for storing a discrete fourier transform of a periodic ramp function;

means for circularly convolving the fourier transform of the received signal with the discrete fourier transform of a periodic ramp function stored in memory to produce an error signal; and a squarer for squaring the error signal to produce an error spectrum.

22. The apparatus of claim 21, wherein said means for circularly convolving the fourier transform of the received signal with a fourier transform of a periodic ramp function comprises:

a memory for storing a fourier transform of a period ramp function; and means for circularly convolving the fourier transform of the received signal with the fourier transform of a periodic ramp function stored in the memory to produce an error signal.

23. The apparatus of claim 22, wherein the periodic ramp function is a unit ramp function.

24. The apparatus of claim 23, wherein the fourier transform of the received signal is a discrete fourier transform of the received signal.

* * * * *